Aug. 25, 1942. H. FRAUENTHAL 2,294,289
METHOD OF MAKING BEARING RETAINING MEANS
Filed Aug. 29, 1939 3 Sheets-Sheet 1

INVENTOR.
HAROLD FRAUENTHAL.
BY Walter E. Schirmer
ATTORNEY.

Aug. 25, 1942.       H. FRAUENTHAL                2,294,289
           METHOD OF MAKING BEARING RETAINING MEANS
              Filed Aug. 29, 1939        3 Sheets-Sheet 2
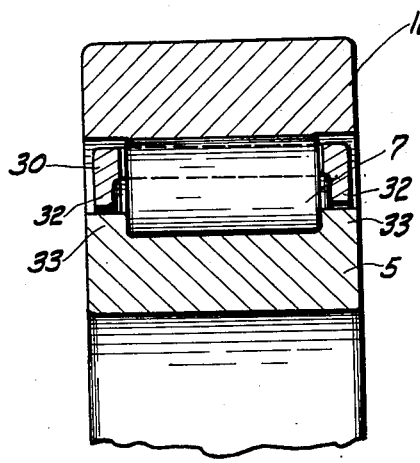
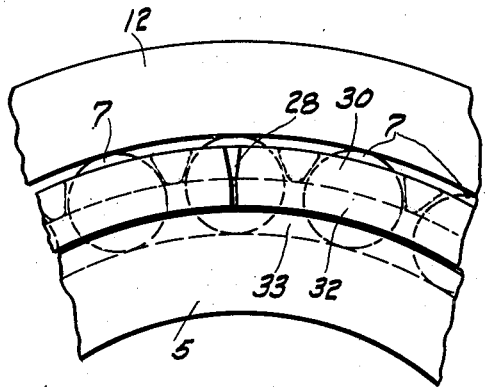
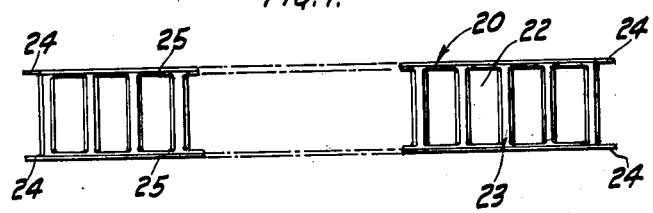
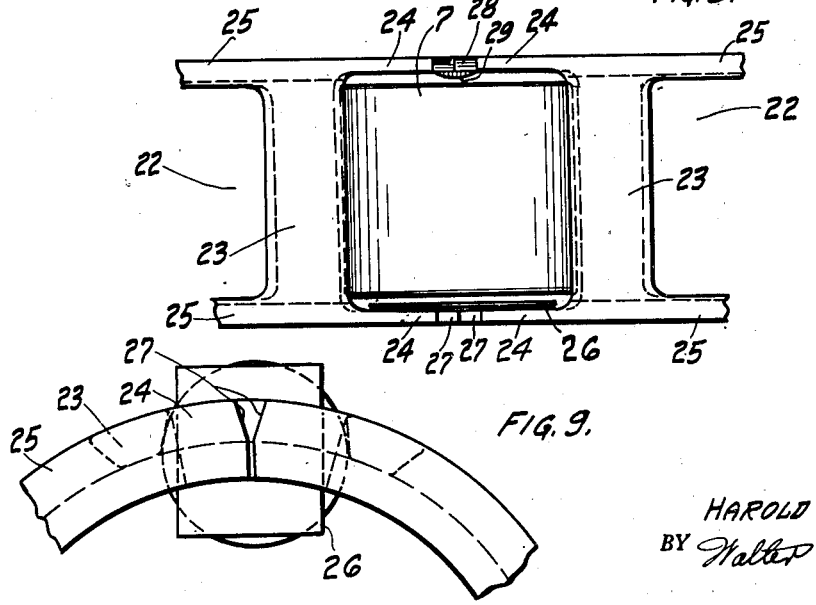
INVENTOR.
HAROLD FRAUENTHAL.
BY
          ATTORNEY.

Aug. 25, 1942.   H. FRAUENTHAL   2,294,289
METHOD OF MAKING BEARING RETAINING MEANS
Filed Aug. 29, 1939   3 Sheets-Sheet 3
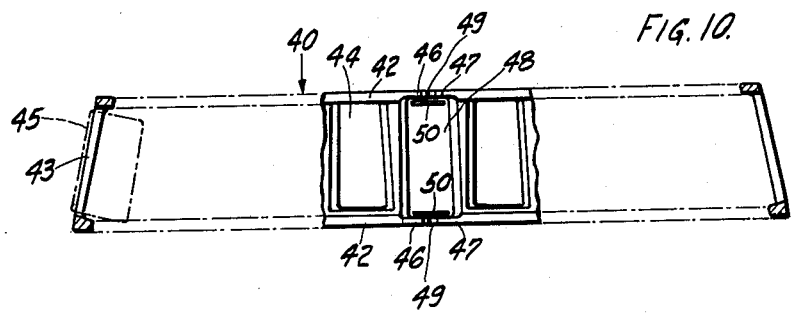
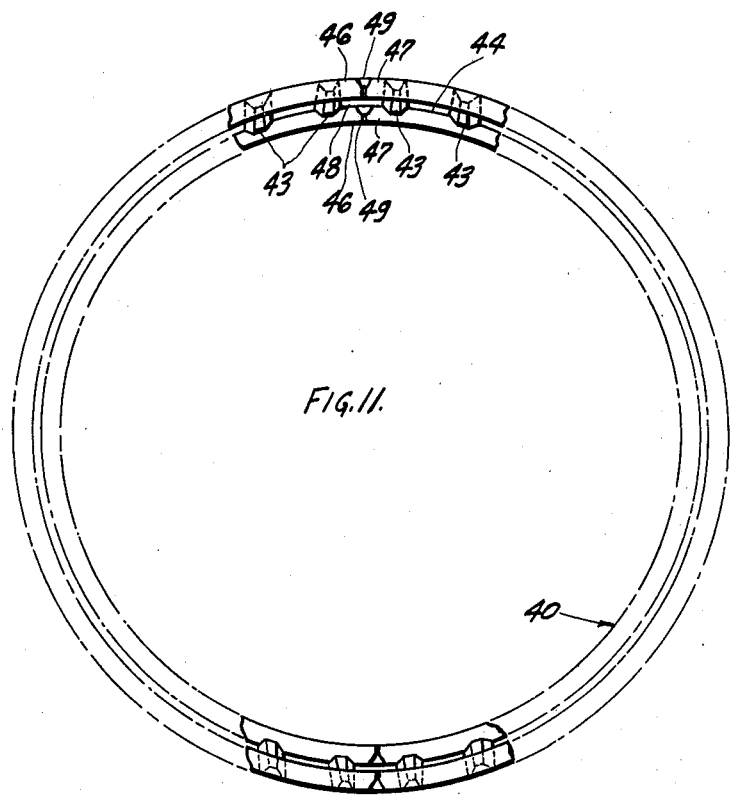
INVENTOR.
HAROLD FRAUENTHAL.
BY Walter E. Schirmer
ATTORNEY.

Patented Aug. 25, 1942

2,294,289

UNITED STATES PATENT OFFICE 2,294,289

METHOD OF MAKING BEARING RETAINING MEANS

Harold Frauenthal, South Bend, Ind., assignor to Bantam Bearings Corporation, South Bend, Ind., a corporation of Indiana Application August 29, 1939, Serial No. 292,478

7 Claims. (Cl. 29—148.4)

This invention relates to bearing retaining means, and more particularly is directed to the construction and assembly of bearing retaining rings used for retaining roller bearing members in a cage to provide for spacing of the rollers and retention of the same upon either an inner or an outer bearing race to facilitate handling of the bearing assembly for shipping and installation.

One of the primary objects of the present invention is to provide a bearing cage or retainer which may be formed from sheet metal stock, suitably punched to provide the roller retaining spaces and which may be then rolled into circular form with the adjacent ends brazed or welded together.

Another object of the present invention is to provide a bearing cage or retaining ring which can be stamped flat from sheet metal and provided with a radially directed lip or edge adapted to ride upon the adjacent bearing race.

Still another object of the present invention is to provide a bearing cage or retainer which can be made in a plurality of sections and assembled with the bearings in position therein, the sections being then secured together by welding or brazing without in any way damaging the rollers or the adjacent race.

One of the important advantages secured by the present invention is the provision of a retainer which can be formed so that the roller members can be positioned therein and the retainer then positioned with respect to its associated race after which assembly the adjacent ends of the retainer or cage sections can be secured together without affecting the characteristics or operating efficiency of the assembly. In a specific form of the invention, I contemplate stamping out a ladder type member that can then be rolled into circular form with the adjacent ends spaced slightly apart. The roller members can then be inserted in position between the retainer and the associated bearing race and the adjacent ends brought together and secured. In order to effect such joining of the adjacent ends, I preferably make the thickness of the connecting webs smaller than the normal thickness of the side flange portions of the cage so that any additional thickness which may be produced due to the welding or brazing operations will not in any manner affect the operation of the roller member disposed in the pocket formed by the joining of the adjacent ends of the cage. For this purpose I also contemplate the use of suitable heat shielding means between the roller member and the adjacent portions of the retainer which are to be welded so as to protect the roller member from the welding heat to prevent any damage to the roller member, which might injure its operating characteristics or affect the heat treatment to which it has been subjected.

It is also possible, by following the present invention, to form bearing retaining or cage members for tapered roller bearings as well as straight roller bearings, the end joining process being substantially the same in either case.

This allows the production of retaining cages of suitable strength and size in a very economical manner, and also allows the assembly of the bearing race, the roller members and the retainer as a unitary structure without producing any distortion or the like of any portions of the assembly, such as was previously the case when the rollers had to be placed into position and the retainer then staked over to secure them against displacement.

Among other advantages of the present construction is the possibility of employing more rollers in a given bearing size, as the webs of the retainer can be made thinner since no staking operations are necessary to retain the rollers in position. Also, the use of bronze retainers of the present invention results in other economies, since they are light in weight, producing less friction on the rollers and requiring less force to carry them around the bearing, and allow bearings of greater capacity due to more rollers being provided than would be possible in the conventional circular cast retainer where the rollers have to be staked in position.

Also, the present invention allows the formation of an assembled unit with either an inner or outer bearing race. This construction is therefore capable of providing an assembled bearing at a relatively low cost, having certain advantageous features which will be more apparent from the following detailed description, which, taken in conjunction with the accompanying drawings, illustrates preferred forms of the present invention.

In the drawings:

Figure 5 is a view corresponding to Figures 1 and 3 of a bearing in which the retainer is provided with radially inturned lips;

Figure 6 is an elevation of a portion of the bearing shown in Figure 5;

Figure 7 is a plan view of a flat stamping forming the retainer of Figure 5;

Figure 8 is an enlarged detail view showing the manner in which the retainer ends are secured together;

Figure 9 is an elevational view of the structure shown in Figure 8 on a slightly smaller scale;

Figure 10 is a plan view of a bearing assembly for a tapered roller bearing; and Figure 11 is an elevational view of the assembly shown in Figure 10.

Figure 1:
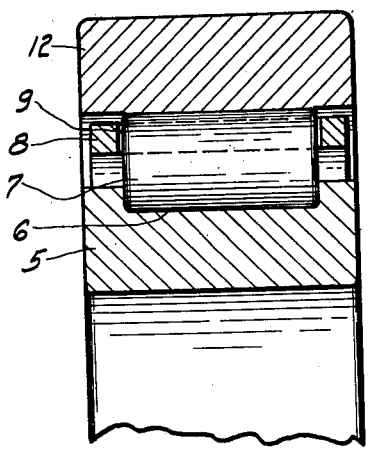
Figure 1 is a transverse section through a portion of a roller bearing assembly employing the present invention.

Referring now in detail to the drawings, in Figure 1 I have provided the inner bearing race 5 which may be mounted on a shaft or similar support, and which is provided with the channel-shaped raceway 6 adapted to receive the roller anti-friction members 7. A suitable retainer or cage 8 is provided having circumferentially spaced pockets 9 in which the roller members 7 are located to space the same apart, the retainer 8 being provided with the transverse webs 10 shown in Figure 2, so arranged as to prevent the rollers 7 from moving radially outwardly with respect to the retainer. The outer race member 12 is adapted to be moved axially into position over the outer surfaces of the rollers 7 to complete the bearing assembly.

It will be noted that in this form of the invention the rollers 7 are retained against axial displacement by the engagement of the lower portions thereof in the channel-shaped raceway 6. The retainer 8 encloses the bearings in such manner as to retain them against radial outward displacement whereby the entire assembly comprising the race 5, the rollers 7 and the retainer 8 can be handled as a single unit, facilitating shipment and installation thereof as the bearings are prevented from any possible displacement.

Figure 3:
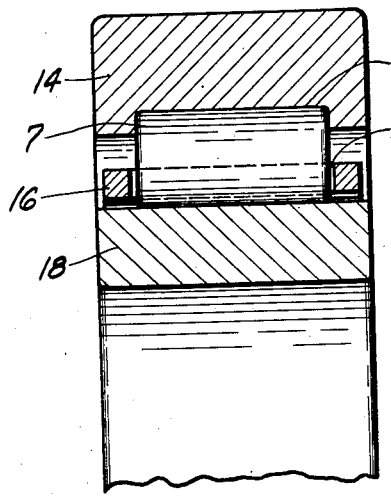
Figure 3 is a view similar to Figure 1 of another form of bearing.

In Figure 3 I have provided a bearing assembly in which the outer race 14 has the channel-shaped raceway 15 formed therein receiving the roller members 7 and locating them axially against displacement. A suitable retaining cage 16 is provided having the pockets 17 within which the rollers are disposed in spaced relation, and which prevents any radial inward displacement of the rollers 7 out of the raceway 15. The inner race member 18 in this form of the invention is axially movable over the rollers into position in alinement with the race 14.

Considering now the manner in which the rollers are retained in position by the cage members 8 and 16, reference should be had to Figures 7, 8 and 9. The races 8 or 16 may be formed by stamping or casting from a flat piece of metal stock, such as brass or the like, a ladder type structure, indicated generally at 20 in Figure 7, which is provided with the pockets 22 spaced apart by the transverse webs 23, these webs having tapering walls which, depending upon whether the retainer is to be used in conjunction with an inner or outer bearing race, serve to retain the antifriction rollers in position against radial displacement. It will be noted that the ends of the stamping or casting 20 comprise longitudinally projecting portions 24 which comprise continuations of the side flanges 25 forming the retainer between which the transverse webs extend with the ends 24 being of reduced thickness, as compared to the normal thickness of the side flanges 25 forming the end walls of the pockets 22. This is clearly shown in Figure 8 in which it will be seen that the thickness of the ends 24 is substantially reduced over that of the side flanges 25 so that the roller member 7 which is to be disposed in these pockets has substantial axial clearance when the two end portions 24 are brought together to complete the circular retainer. The purpose of providing this spacing at the ends of the roller 7 is to allow the positioning of a heat shielding plate, such as indicated at 26, over the end face of the bearing while adjacent ends 24 are being welded or brazed together. Preferably, the ends 24 are so formed as to provide a V-shaped opening 27 when brought together, as indicated clearly in Figure 9. In this opening, suitable weld metal is deposited and is heated in any suitable manner for bonding the same firmly to the adjacent surfaces 27 at the ends of the end portion 24. This weld metal, as indicated at 28 in Figure 8, substantially fills the V-shaped opening and projects inwardly thereof, as indicated at 29, to an extent such as to reduce the clearance between the end of the roller and the end of the pocket. The shield 26 may be formed of asbestos or any other similar material having heat insulating characteristics, and is positioned so as to protect the end face of the roller against any heat which might change the temper of the roller 7 during the welding of the edges 27 together. Any weld metal which projects outwardly of the side flanges 25 may be machined off with little or no difficulty, and any portions 28 which project into the pocket are of such extent as to interfere in no manner with the operation of the roller and yet form end pads preventing too great axial movement of the roller within the pocket.

It is to be understood that the welding of the two end portions at opposite sides of the retainer can be accomplished simultaneously with suitable heat insulating sheets 26 disposed against opposite end faces of the rollers in the pocket during the welding. It is to be understood, of course, that all of the rollers are positioned in the respective pockets 22 at the time welding occurs, since the entire assembly of the bearing race rollers and retainer is completed before the ends are welded, it being desirable to allow the retainer to be spread apart sufficiently to provide for insertion of the rollers prior to the welding operation with the ends being then moved together so as to hold the rollers in position against radial displacement while the edges are being welded.

Figure 2:
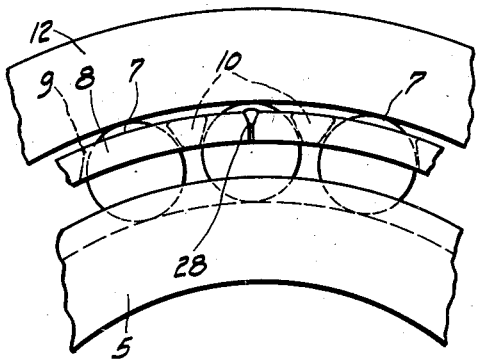
Figure 2 is an elevational view taken substantially on line 2—2 of Figure 1.
Figure 4:
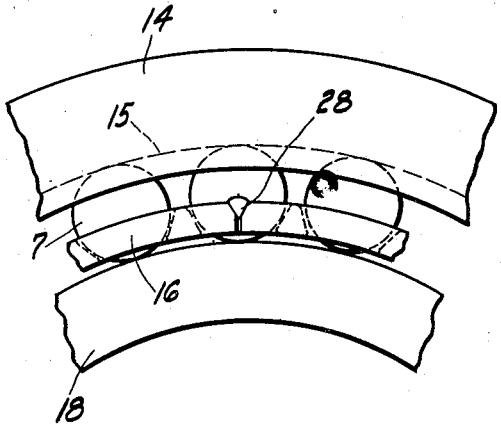
Figure 4 is an elevation taken on line 4—4 of Figure 3.

After the welding operation, the retainer comprises an integral hoop which, depending upon the position of the webs 23, can be used either for retaining the rollers in an outer race member or an inner race member, depending upon whether the bearing construction is of the type shown in Figures 1 or 2, or that shown in Figures 3 and 4. It is of course obvious that the portions 28, indicated in Figures 2 and 4, are the welded portions of the retainer corresponding to the structure shown in Figures 8 and 9.

While the construction for securing the retainer edges together has been described in connection with a retainer formed from a stamping such as shown in Figures 7, it is to be understood that the retainer may also be formed as a cast metal section which may be cast either flat or in arcuate form, and that a plurality of retainer sections can be employed for bearings of large diameter with the adjacent ends of each section being welded together as disclosed in Figures 8 and 9.

It may also be desirable in certain types of bearings to provide heat insulating material for insulating the adjacent raceway against the welding heat during the welding operation, and for this purpose, the additional sheet material 26 may be inserted between the side flanges 25 of the retainer and the adjacent arcuate surface of the bearing race, thereby thoroughly protecting both the race and the rollers against the welding heat.

In Figures 5 and 6 I have provided a construction corresponding to Figure 1 in which the inner race 5 has the channel shaped raceway for receiving the rollers 7. However, in this form of the invention, the retainer 30 is of the type having radially inturned flanges 32 at the sides thereof, which flanges are adapted to center on the flange or lip portions 33 defining the raceway of the inner race 5. Such a retainer may be formed from a stamping which, during the stamping operation, has the edges thereof turned inwardly at the same time that the pockets are stamped out of the retainer. The retainer 30 may thus be formed in the same manner as the retainer shown in Figure 7, and the end portions thereof secured together after being rolled into a circle by welding as indicated at 28 in Figure 6.

In Figures 10 and 11 I have provided a bearing construction in which the retainer is formed as a frusto-conical member indicated generally at 40 and comprising the side flanges 42 between which extend the transverse web portions 43 defining pockets 44 for receiving the roller members indicated diagrammatically at 45. The adjacent ends 46 and 47 of the stamping or casting forming the retainer are reduced in thickness to provide a pocket 48 of greater axial length. Within this pocket is disposed a roller corresponding to the roller 45, which roller is protected during the welding of the meeting edges 49 of the ends 46 and 47 by means of the insulating sheets 50 disposed adjacent opposite ends of the pocket 48 and protecting the end faces of the rollers. The construction in all respects, other than being of such form as to accommodate a tapered bearing assembly, is similar to the construction shown in the previous embodiments of the invention, and the ends are secured together in the same manner.

It is therefore believed apparent that I have provided a novel type of retaining ring or cage for assembling the bearings as a unit with the bearing race and preventing any radial or circumferential shifting thereof with the end portions of the ring after the bearings have been assembled therein being welded or brazed in the manner described in detail in Figures 7 and 8, and with the roller disposed in the pocket formed in the meeting ends being protected against the welding heat by the use of heat insulating sheets or pads disposed over the end faces thereof.

This construction provides a simple type of retainer which can be formed from a stamping, and which can readily have the bearings assembled in position before joining the adjacent ends to complete the hoop structure of the cage with the bearings retained therein in position on the bearing race and against radial displacement.

I am aware that various changes may be made in certain details of the present invention without in any manner departing from the underlying principles thereof, and I therefore do not intend to be limited except as defined by the scope and spirit of the appended claims.

I claim:

1. The method of forming a roller bearing retainer which comprises stamping out a flat ladder-like member with parallel side flanges and transverse webs forming bearing retaining pockets, forming end projections at opposite ends of each side flange of reduced thickness, bending said retainer into circular form and inserting rollers into each pocket including the one formed by said end projections, inserting heat insulating sheets between the end faces of the roller in said one pocket, and then welding the meeting edges of the respective end projections together.

2. The method of forming a roller bearing retaining cage which comprises forming a ladder-type member having parallel side flanges and transverse webs therebetween providing roller pockets, producing end projections of said flanges of reduced thickness, rolling said member into circular form with said projections forming a pocket of increased axial length, inserting rollers into each pocket, inserting sheets of heat insulating material between the end faces of the roller in said one pocket and welding the edges of said projections together.

3. In the method of assembling a retainer of arcuate cast section construction having adjacent end projections each forming a half roller pocket, the novel steps comprising inserting a roller between said end projections, bringing the projections together to form a complete pocket for said roller and insulating the end faces of said roller while welding the projections together.

4. The method of forming a roller bearing retainer which comprises forming a ladder type stamping having transverse roller pockets and end projections of a thickness less than the end wall thickness of said retainer at said pockets, bending said stamping into a retainer for a bearing race with rollers disposed in said pockets and in the axially lengthened pocket formed by abutment of said end projections, insulating the roller in said last-named pocket, and then welding said abutting end projections together.

5. The method of assembling a roller bearing with the rollers retained in position relative to a bearing race which comprises forming a longitudinal stamping having transverse roller pockets and oppositely extending longitudinal end projections, bending said stamping into a retainer ring with rollers retained on said race and disposed in said pockets, said end projections forming a roller pocket between the ends of said retainer, axially insulating a roller in said end-formed pocket from said projections, and then welding said projections together.

6. A method of forming a roller bearing retainer from arcuate cast sections, each section having transverse roller pockets and end projections of a thickness less than the end wall thickness of the section at the pocket which comprises assembling said sections into a circular position relative a race member with said end projections in abutment, inserting rollers into each of said pockets and into the pockets formed by abutment of said end projections, and welding said abutting end projections together.

7. In the method set forth in claim 6, the further step of insulating the rollers in said last-named pockets prior to welding said abutting end projections.

HAROLD FRAUENTHAL.